(12) United States Patent
Hirschbold et al.

(10) Patent No.: US 9,792,552 B2
(45) Date of Patent: Oct. 17, 2017

(54) PREDICTION OF AVAILABLE GENERATOR RUNNING TIME

(75) Inventors: Markus F. Hirschbold, Victoria (CA); John C. Van Gorp, Sidney (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/409,697

(22) PCT Filed: Jun. 29, 2012

(86) PCT No.: PCT/US2012/045012
§ 371 (c)(1),
(2), (4) Date: Dec. 19, 2014

(87) PCT Pub. No.: WO2014/003788
PCT Pub. Date: Jan. 3, 2014

(65) Prior Publication Data
US 2015/0324696 A1    Nov. 12, 2015

(51) Int. Cl.
*G06N 5/04* (2006.01)
*G06N 99/00* (2010.01)
(Continued)

(52) U.S. Cl.
CPC ............. *G06N 5/04* (2013.01); *G06N 99/005* (2013.01); *H02J 3/12* (2013.01); *H02J 3/14* (2013.01);
(Continued)

(58) Field of Classification Search
None
See application file for complete search history.

(56) References Cited

U.S. PATENT DOCUMENTS 3,705,280 A    12/1972    Harms
4,231,029 A    10/1980    Johnston
(Continued)

FOREIGN PATENT DOCUMENTS

GB           516265 A      12/1939
IE    WO 2011128883 A2 *  10/2011    ............. G01R 22/10

OTHER PUBLICATIONS

Notification of Transmittal of the International Search Report and the Written Opinion of the International Searching Authority from corresponding PCT/US2012/045012 dated Sep. 14, 2012.
(Continued)

*Primary Examiner* — Paulinho E Smith
*Assistant Examiner* — Benjamin Buss
(74) *Attorney, Agent, or Firm* — Lando & Anastasi, LLP (57) ABSTRACT

At least one aspect of the invention is directed to a power monitoring system including a generator coupled to a fuel tank, a plurality of monitors, and a processor configured to monitor one or more loads drawing power from the generator; monitor one or more parameters that affect the amount of power drawn by the one or more loads; monitor a fuel consumption rate of the generator; generate one or more load profiles for each of the one or more loads; receive a set of the one or more loads for which a predicted time is to be generated; receive values for the one or more parameters; generate a predicted load profile for the set of the one or more loads and the values of the one or more parameters; receive information indicating an amount of remaining fuel; and calculate a predicted available run time.

20 Claims, 8 Drawing Sheets

(51) Int. Cl.
*H02J 3/12* (2006.01)
*H02J 3/14* (2006.01)
*H02J 9/08* (2006.01)
*H02J 3/00* (2006.01)

(52) U.S. Cl.
CPC .......... *H02J 9/08* (2013.01); *H02J 2003/003* (2013.01); *Y02B 70/3225* (2013.01); *Y04S 10/54* (2013.01); *Y04S 20/222* (2013.01); *Y04S 20/224* (2013.01)

(56) References Cited

U.S. PATENT DOCUMENTS

| | | | |
|---|---|---|---|
| 4,611,289 A | 9/1986 | Coppola | |
| 4,674,031 A | 6/1987 | Siska, Jr. | |
| 4,763,013 A | 8/1988 | Gvoth, Jr. et al. | |
| 4,769,555 A | 9/1988 | Pequet et al. | |
| 4,918,562 A | 4/1990 | Pulizzi et al. | |
| 5,081,367 A | 1/1992 | Smith et al. | |
| 5,270,576 A | 12/1993 | Kahle | |
| 5,424,903 A | 6/1995 | Schreiber | |
| 5,450,334 A | 9/1995 | Pulizzi et al. | |
| 5,462,225 A | 10/1995 | Massara et al. | |
| 5,525,898 A * | 6/1996 | Lee, Jr. ............... | G01R 19/25 324/113 |
| 5,534,734 A | 7/1996 | Pugh et al. | |
| 5,646,459 A | 7/1997 | Hatate et al. | |
| 5,721,934 A | 2/1998 | Scheurich | |
| 5,923,103 A | 7/1999 | Pulizzi et al. | |
| 5,939,802 A | 8/1999 | Hornbeck | |
| 6,011,327 A | 1/2000 | Cook et al. | |
| 6,172,428 B1 | 1/2001 | Jordan | |
| 6,172,432 B1 | 1/2001 | Schnackenberg et al. | |
| 6,181,028 B1 | 1/2001 | Kern et al. | |
| 6,285,178 B1 | 9/2001 | Ball et al. | |
| 6,330,176 B1 | 12/2001 | Thrap et al. | |
| 6,570,269 B2 | 5/2003 | McMillan et al. | |
| 6,630,752 B2 | 10/2003 | Fleming et al. | |
| 6,633,802 B2 | 10/2003 | Sodoski et al. | |
| 6,683,778 B2 | 1/2004 | Yugou | |
| 6,721,672 B2 | 4/2004 | Spitaels et al. | |
| 6,741,442 B1 | 5/2004 | McNally et al. | |
| 6,765,373 B1 | 7/2004 | Harvey et al. | |
| 6,825,578 B2 | 11/2004 | Perttu | |
| 6,876,103 B2 | 4/2005 | Radusewicz et al. | |
| 6,879,060 B2 | 4/2005 | Hohri | |
| 7,015,599 B2 | 3/2006 | Gull et al. | |
| 7,058,526 B2 | 6/2006 | Daun-Lindberg et al. | |
| 7,098,555 B2 | 8/2006 | Glahn et al. | |
| 7,119,457 B1 | 10/2006 | Flegel | |
| 7,141,891 B2 | 11/2006 | McNally et al. | |
| 7,142,950 B2 | 11/2006 | Rasmussen et al. | |
| 7,173,347 B2 | 2/2007 | Tani et al. | |
| 7,282,813 B2 | 10/2007 | Unger et al. | |
| 7,514,815 B2 | 4/2009 | Paik et al. | |
| 7,786,617 B2 | 8/2010 | Paik et al. | |
| 8,446,040 B2 | 5/2013 | Paik et al. | |
| 2002/0024332 A1 | 2/2002 | Gardner | |
| 2002/0130556 A1 | 9/2002 | Hohri | |
| 2002/0134567 A1 | 9/2002 | Rasmussen et al. | |
| 2003/0034693 A1 | 2/2003 | Wareham et al. | |
| 2003/0048004 A1 | 3/2003 | Fleming et al. | |
| 2003/0048005 A1 | 3/2003 | Goldin et al. | |
| 2003/0062775 A1 | 4/2003 | Sinha | |
| 2003/0072977 A1 | 4/2003 | Speranza et al. | |
| 2003/0111842 A1 | 6/2003 | Gilbreth et al. | |
| 2004/0075343 A1 | 4/2004 | Wareham et al. | |
| 2004/0084965 A1 | 5/2004 | Welches et al. | |
| 2004/0169972 A1 | 9/2004 | Goss | |
| 2004/0262058 A1 | 12/2004 | Boltze et al. | |
| 2005/0165511 A1 * | 7/2005 | Fairlie ................ | F17D 1/04 700/286 |
| 2006/0072262 A1 * | 4/2006 | Paik ................... | H02J 3/14 361/62 |
| 2007/0018506 A1 | 1/2007 | Paik et al. | |
| 2008/0313006 A1 * | 12/2008 | Witter ................. | G06F 1/26 705/7.17 |
| 2009/0027932 A1 * | 1/2009 | Haines ................ | H02J 9/062 363/95 |
| 2009/0045804 A1 * | 2/2009 | Durling ................ | G01D 4/008 324/140 R |
| 2010/0191487 A1 * | 7/2010 | Rada ................... | G05F 1/70 702/60 |
| 2010/0324962 A1 * | 12/2010 | Nesler ................. | G05B 15/02 700/292 |
| 2011/0061015 A1 * | 3/2011 | Drees .................. | G05B 15/02 715/771 |
| 2011/0251807 A1 * | 10/2011 | Rada ................... | G01D 4/00 702/61 |
| 2012/0022700 A1 * | 1/2012 | Drees .................. | G05B 15/02 706/52 |
| 2012/0029711 A1 * | 2/2012 | Besore ................ | G01D 4/004 700/287 |
| 2012/0109553 A1 | 5/2012 | Hancock et al. | |
| 2012/0188087 A1 * | 7/2012 | Wang .................. | H04L 67/303 709/202 |
| 2012/0245751 A1 * | 9/2012 | Gow ................... | H02J 3/14 700/291 |
| 2012/0259583 A1 * | 10/2012 | Noboa ................. | G05B 15/02 702/179 |
| 2013/0085614 A1 * | 4/2013 | Wenzel ................ | F24F 11/006 700/277 |
| 2013/0191103 A1 * | 7/2013 | Chu .................... | G06F 17/5036 703/14 |
| 2013/0338947 A1 * | 12/2013 | John ................... | H02J 7/35 702/60 |
| 2015/0168975 A1 * | 6/2015 | Loucks ................ | H02J 9/061 700/296 |

OTHER PUBLICATIONS

APC User's Guide Brochure, "InfraStruXure Manager," Mar. 2004, 181 pps.

Cutler-Hammer, "Switchboards Integrated Facility Switchboards," Jan. 2003, vol. 1, Ref. No. (0893), 1 pp.

MGE UPS Systems Brochure, "Galaxy 3000—Data Center Grade Power Protection for Critical Environments," Dec. 2001, 4 pps.

MGE UPS Systems Brochure, "Galaxy PW—Next Generation Critical Power Protection System," Jun. 2002, 2 pps.

* cited by examiner

PREDICTION OF AVAILABLE GENERATOR RUNNING TIME

This application is a U.S. National Stage Application under 35 U.S.C. §371 from International Application No. PCT/US2012/045012, filed Jun. 29, 2012, which is hereby incorporated by reference in its entirety for all purposes.

BACKGROUND

Field of Invention

The present invention relates to systems and methods for predicting available generator running time.

Discussion of Related Art

Facilities often rely on electricity to operate numerous systems. Facilities can draw the electricity from an electric utility, but also have a generator to use as a backup in case of power failure or other problems. It is often useful to have an estimation of time available for running the facility on the generator. An accurate estimate of remaining time can allow facility operators to respond accordingly, such as shutting down certain systems or refueling the generator.

SUMMARY

At least one aspect of the invention is directed to a power monitoring system for a facility. The power monitoring system may include a generator coupled to a fuel tank, a plurality of monitors configured to monitor power drawn by loads in the facility from the generator, and a processor. The processor is configured to be coupled to the plurality of monitors and configured to monitor one or more loads drawing power from the generator, monitor one or more parameters that affect the amount of power drawn by the one or more loads, and monitor a fuel consumption rate of the generator. The processor is further configured to generate one or more load profiles for each of the one or more loads, each load profile determining power drawn by a corresponding load over a period of time for a set of values of the one or more parameters. The processor is also configured to receive a set of the one or more loads for which a predicted time is to be generated, receive values for the one or more parameters, generate a predicted load profile for the set of the one or more loads and the values of the one or more parameters. The processor is also configured to receive information indicating an amount of remaining fuel and calculate a predicted available run time based on the power drawn by the predicted load profile, the fuel consumption rate of the generator, and the amount of remaining fuel.

In some embodiments, the processor is further configured to identify a first group of the one or more loads as critical loads and a second group of the one or more loads is identified as non-critical, and wherein the set of the one or more loads includes at least the first group of the one or more loads.

In some embodiments, the processor is further configured to identify a first group of the one or more loads as delayable loads and a second group of the one or more loads is identified as non-delayable loads, and wherein the set of the one or more loads includes at least the second group of the one or more loads.

In some embodiments, the received values for the one or more parameters include predicted values for the one or more parameters.

In some embodiments, the processor is further configured to determine a plurality of sets of the one or more loads for which a predicted time is to be generated.

In some embodiments, the processor is further configured to receive a length of time and provide one or more of the plurality of sets of the one or more loads for which the predicted time is longer than the length of time.

In some embodiments, the loads comprise a priority ranking, and the one or more provided sets comprises an optimized number of powered loads based on the priority ranking.

In some embodiments, the generator is a generator system comprising a plurality of generators coupled to a plurality of fuel tanks, and the processor is further configured to determine one or more sets of the plurality of generators to power the loads and calculate the predicted available run time for each of the one or more sets of the plurality of generators.

Still other aspects, examples and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A power monitoring system can provide more accurate predictions of available generator running time by more accurately predicting the load that will be drawing power from the generator. The load can be predicted by monitoring individual component loads during operation and generating component load profiles. For example, the aggregate load can be for a facility, and the individual components can be the various systems in the facility that draw power, such as lighting systems and ventilation systems. The load profiles can be monitored to determine parameters that affect the load profiles. The parameters can include environmental parameters, operational parameters, and other variables that affect the power drawn by each system. By generating more accurate load profiles, the load profiles can be used to more accurately predict future power usage and thus available running time. By determining parameters that affect the power usage, future known or predicted parameters can also be used to more accurately predict future load.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
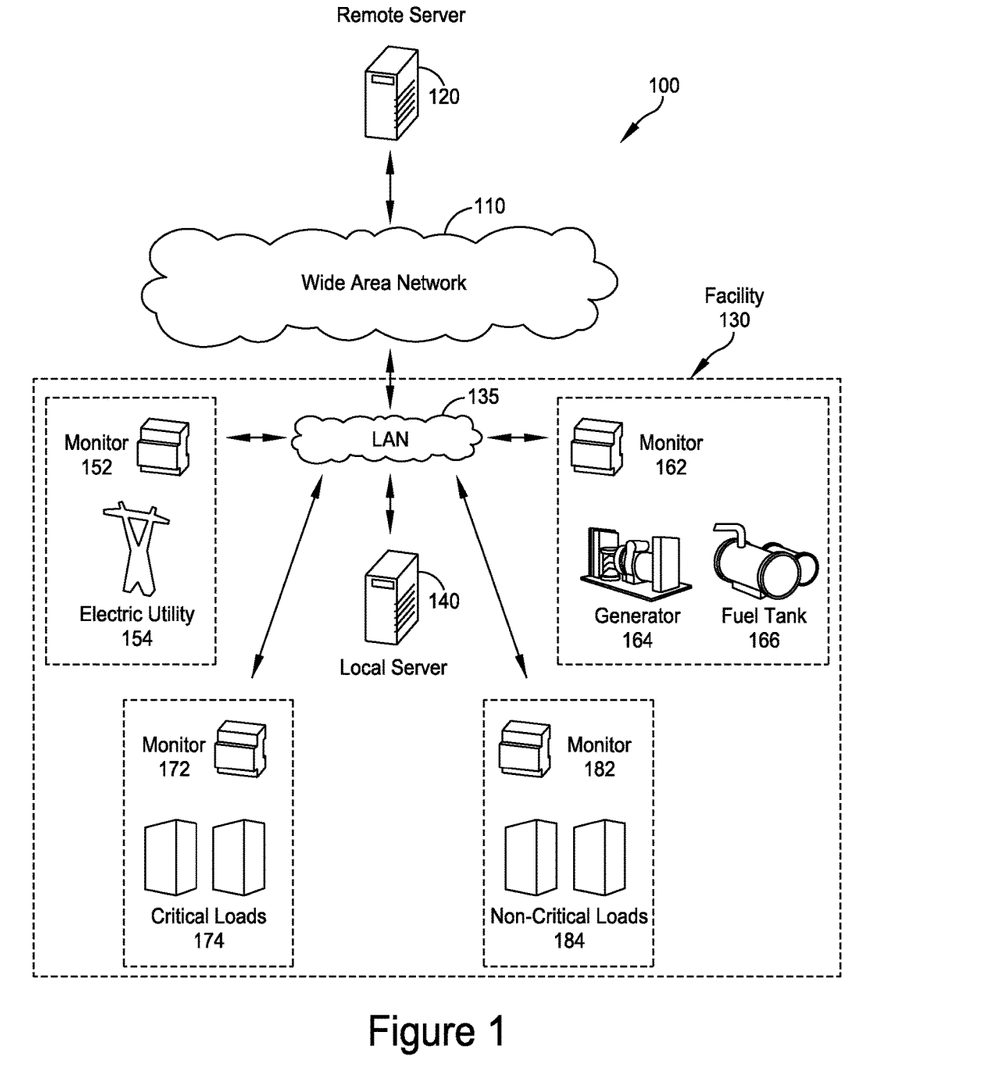
FIG. 1 is a block diagram of a power monitoring system according to aspects of some embodiments.

FIG. 1 shows an example block diagram of a power monitoring system 100 according to some embodiments. The power monitoring system 100 includes a facility 130 with monitoring devices 152, 162, 172, 182 connected to a network, such as a local area network (LAN) 135. The monitoring devices 152, 162, 172, 182 monitor various energy sources such as an electric utility 154 and a generator 164. The monitoring devices 152, 162, 172, 182 also monitor loads that use power and transmit data to a local server 140 and/or a remote server 120. The remote server 120 and/or the local server 140 can monitor the power usage and the energy sources to predict available remaining generator time.

The LAN 135 can be connected to another network, such as a wide area network (WAN) 110. The remote server 120 is connected to the WAN 110 and can communicate with devices connected to the LAN 135 via the WAN 110. Each of the monitoring devices 152, 162, 172, 182 monitors one or more parameters of one or more associated energy sources and/or loads and communicates data and parameter values to the local server 140 via the LAN 135. Alternatively or additionally, the monitoring devices 152, 162, 172, 182 can communicate parameter values to the remote server 120 via the LAN 135 and the WAN 110. In some embodiments, the remote server 120 can be located in the facility 130, and thus connected to the monitoring devices 152, 162, 172, 182 and the local server 140 via the LAN 135. In some embodiments, the local server 140 and the remote server 120 are on a same physical device.

In some example embodiments, the facility 130 has two energy sources, the electric utility 154 and the generator 164. The facility 130 has two groups of energy loads, critical loads 174 and non-critical loads 184. A first monitor 152 monitors parameters of the electric utility 154 and a second monitor 162 monitors parameters of the generator 164 and a fuel tank 166 used by the generator 164. Third and fourth monitors 172, 182 monitor parameters of the critical loads 174 and the non-critical loads 184, respectively. Alternatively or additionally, a single monitor can monitor a plurality of loads, or each load can have a corresponding monitor. The parameters include electrical parameters such as voltage, current, power (kilowatts) and energy (kilowatt hours). The parameters also include operational status of the critical and non-critical loads 174, 184, such as whether loads are on or off, or operating modes of loads. The parameters also include environmental parameters such as indoor temperature, outdoor temperature, humidity, wind speed, time of day, and time of year. The parameters also include measure of facility activity, such as occupancy. The parameters also include other variables that affect the amount of power drawn by the loads, for example, the condition of the equipment.

The critical loads 174 can include loads that are more important to maintain a power supply, relative to non-critical loads 184. For example, a lighting system in a facility can be considered a critical load 174 compared to a washer/dryer system. Alternatively or additionally, loads can be categorized as delayable or non-delayable. A delayable load can be a load to which power to the circuit can be temporarily cut off (interrupted) as needed (to handle overloads for example) and restored at a later time. For example, a heating, ventilation, and air conditioning (HVAC) system can be considered a delayable load if the HVAC system is designed to cycle on and off in typical operation. Thus, power can be temporarily cut off without functionally affecting the HVAC system.

The monitors 152, 162, 172, 182 provide a user with information to manage the critical and non-critical loads 174, 184 given the availability of power from the electric utility 154 and the generator 164. The user can obtain the information directly from the monitors 152, 162, 172, 182 or from software running on the local server 140 and/or the remote server 120. For example, the electric utility 154 can provide power to both the critical loads 174 and the non-critical loads 184 of the facility 130. If power from the electric utility 154 becomes unavailable, the generator 164 is brought online to supply electrical power. In some embodiments, the generator 164 can supply power only to the critical loads 174. Alternatively or additionally, the generator 164 can supply power to both the critical loads 174 and the non-critical loads 184 depending on the estimated time to restore power from the electrical utility 154 and the amount of fuel available in the fuel tank 166 and the predicted available running time of the generator 164. In some embodiments, depending on the predicted available running time of the generator 164, power can be supplied to critical loads 174 and non-delayable loads among the non-critical loads 184.

Figure 2:
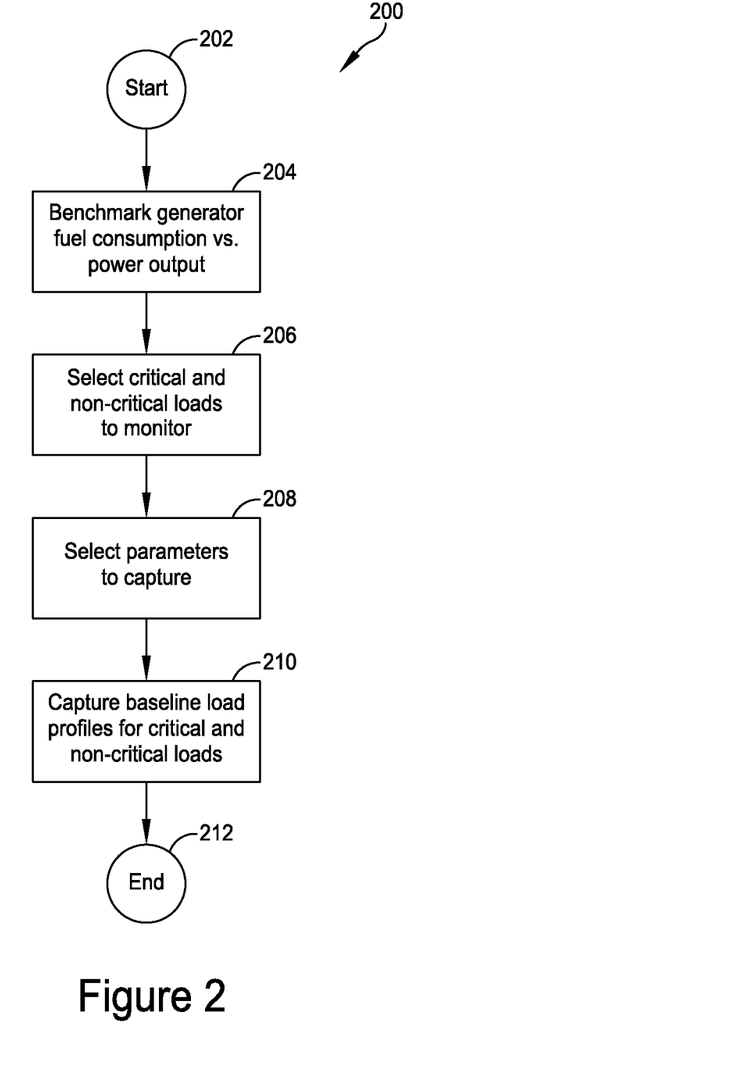
FIG. 2 illustrates a process flowchart of a power monitor system according to aspects of some embodiments.

To predict remaining available running time, the local server 140 and/or the remote server 120 can estimate how much power the facility 130 will draw from the generator 164, and thus the rate at which the generator 164 will consume the fuel remaining in the fuel tank 166. The power monitoring system 100 estimates the power consumption of the facility by generating profiles for the loads drawing power. FIG. 2 shows an example process 200 of the power monitoring system 100. The process 200 starts at stage 202. At stage 204, a benchmark measure is calculated to determine how much fuel the generator 164 consumes to output one or more known amounts of power. At stage 206, loads are selected to monitor. The loads that are monitored can include critical load and non-critical loads, as well as delayable and non-delayable loads. In some embodiments, the loads that are monitored are all the loads that can draw power from the generator 164 in the facility 130. At stage 208, parameters are selected to capture at stage 208. The parameters can include electrical parameters, operational parameters, environmental parameters, and facility parameters. At stage 210, the system captures baseline load profiles for each of the loads and parameters selected. The process can end at stage 212.

Figure 3:
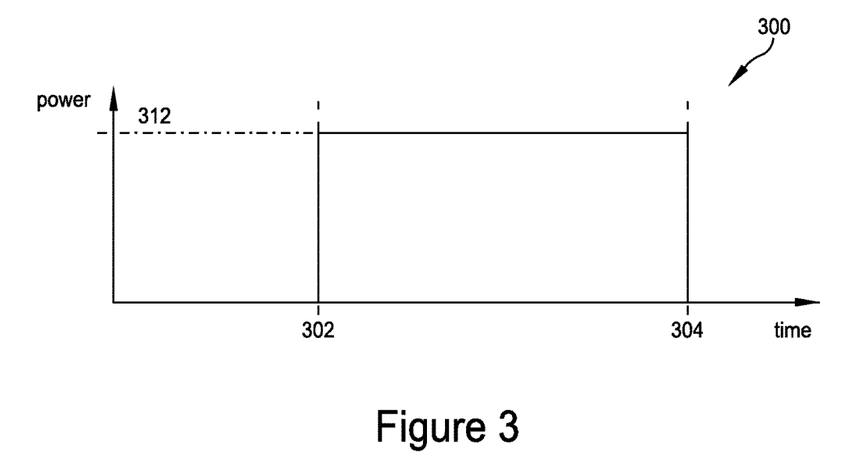
FIG. 3 illustrates an example load profile according to aspects of some embodiments.

For example, FIG. 3 shows an example load profile 300 showing an instantaneous power draw of a load over time. The load profile 300 is an example of a load with basic on or off modes of operation. At time 302, the load is turned on and the power drawn rises to level 312. At time 304, the load is turned off and the power drawn drops back to zero. For example, lighting circuits within a facility can exhibit a load profile similar to the load profile 300.

Figure 4:
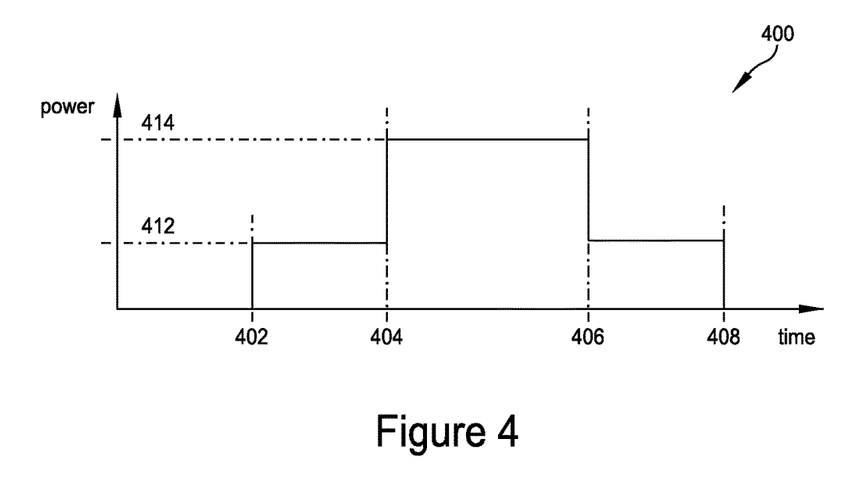
FIG. 4 illustrates an example load profile according to aspects of some embodiments.

FIG. 4 shows an example load profile 400 of a load with two active modes of operation. The power drawn by the load rises to level 412 at time 402 and then up to level 414 at time 404. The power drawn drops back to level 412 at time 406, and then down to zero at time 408. Loads that have multiple modes of operation with relatively constant power draw levels at each of the modes can be modeled with the load profile 400. For example, commercial washers and dryers can exhibit a load profile similar to the load profile 400.

Figure 5:
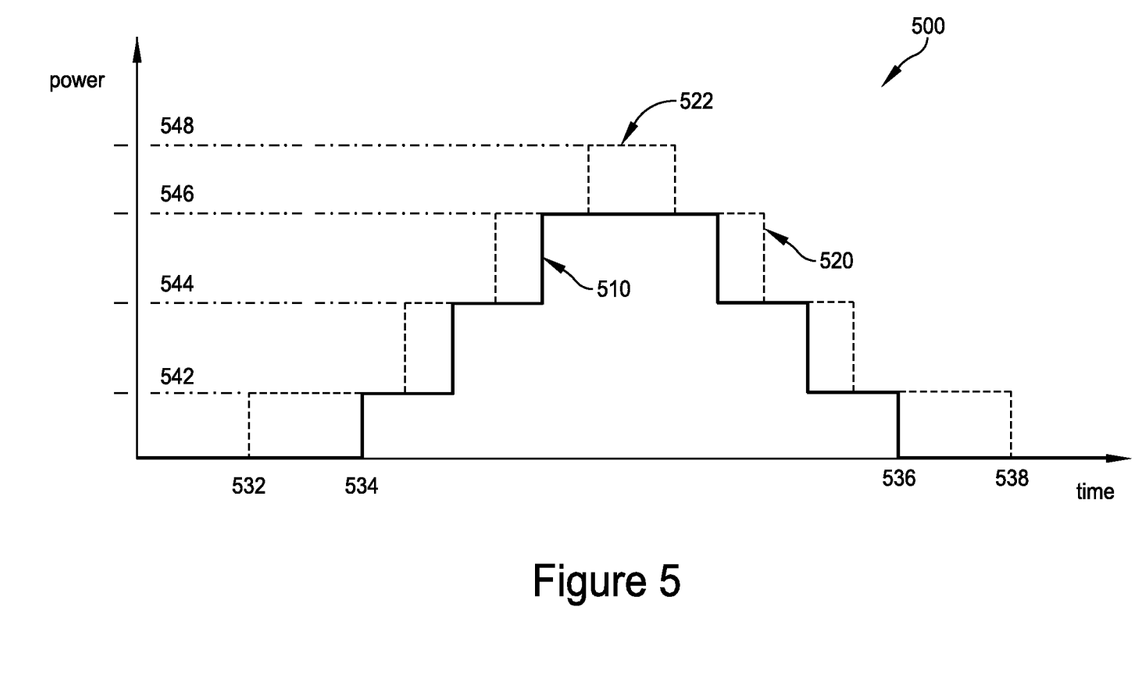
FIG. 5 illustrates an example load profile according to aspects of some embodiments.

FIG. 5 shows an example load profile 500 of a multi-stage load that is affected by one or more environmental parameters. The load profile 500 shows a first load profile 510 and a second load profile 520. The first load profile 510 ramps up and then down through power draw levels 542, 544, and 546, starting at time 534 and ending at time 536. The second load profile 520 also ramps up and down through levels 542, 544, and 546, but begins earlier at time 532 and ends later at time 538. The second load profile 520 remains at each power level for a longer time duration than the first load profile 510, and includes an additional power level 548. Both profiles 510, 520 can model operation of a same complex load but under some change in one or more environmental parameters. For example, the load profiles 510, 520 can represent operation of a multi-stage HVAC unit, with the first load profile 510 representing operation during a day with cool outdoor temperatures and the second load profile 520 representing operation during a day with warmer outdoor temperatures. A peak power consumption 522 at power level 548 can represent operation of an additional component within the HVAC unit in response to the warmer outdoor temperature, such as an additional fan or compressor motor. While the load profile 500 shows two load profiles, a load profile can include any appropriate number of load profiles for varying values of one or more environmental parameters.

Figure 6A:
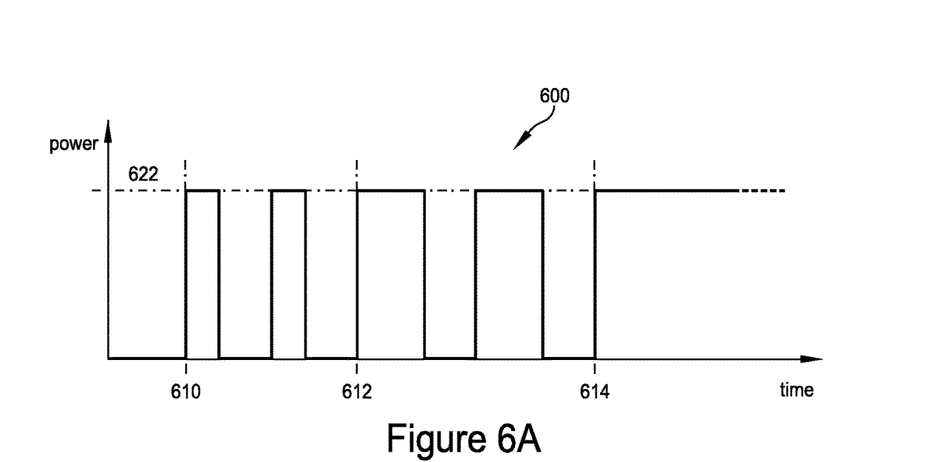
FIG. 6A illustrates an example load profile according to aspects of some embodiments.
Figure 6B:
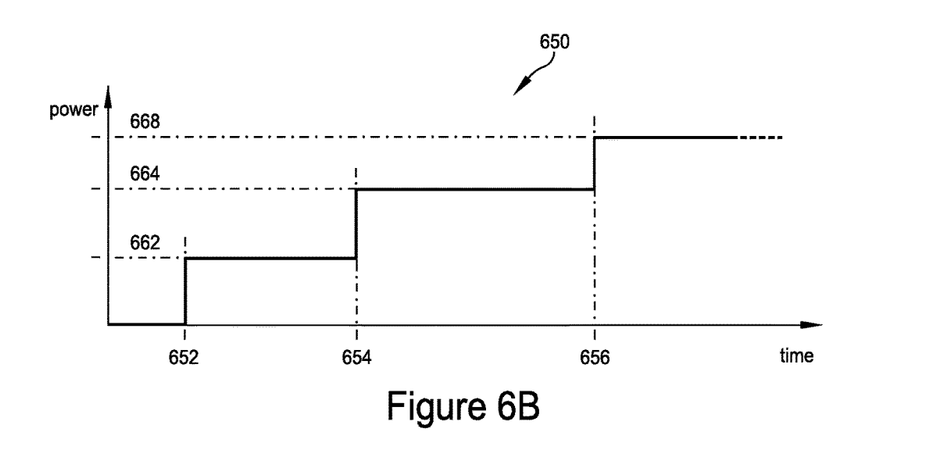
FIG. 6B illustrates an example load profile according to aspects of some embodiments.

FIGS. 6A and 6B show example load profiles 600, 650 of a load that switches rapidly between modes of operation. The load profile 600 shows a load that switches between an off mode and an on mode, where it draws power level 622, with the time duration spent in each mode varying. Between time 610 and 612 the load switches on and off at a first duty cycle, and between time 612 and 614 the load switches on and off at a second duty cycle. The load profile 650 of FIG. 6B can be a simplified model of the load profile 600 of FIG. 6A. The load profile 650 averages the power levels between one or more time intervals, which can be used to represent the demand the load will draw from a power source for the time intervals. The load profile 650 can use a fixed time interval to calculate each average power level. Alternatively or additionally, the load profile 650 can use a varying time interval depending on the mode-switching behavior of the load.

For example, a ventilation fan can exhibit a load profile similar to the load profile 600 and can be modeled by the load profile 650. The fan can be programmed to switch on and off at different duty cycles depending on occupancy within the facility. The facility occupancy can be modeled according to time of day. The fan can remain on at level 622 for only short durations of time early and late in the day when fewer people are present within the facility, as shown between time 610 and 612. This operation can be represented as an average power demand at level 662 between time 652 and 654. During times of the day leading up to (and following) a peak occupancy, the fan can remain on at level 622 for longer periods of time, as shown between time 612 and 614. The increased running time also increases the average power demand, shown in the load profile 650 to level 664 between time 654 and 656. The fan can remain on for some length of time when the facility is at peak occupancy, which is shown in the load profile 650 at power level 668 after time 656.

Figure 7:
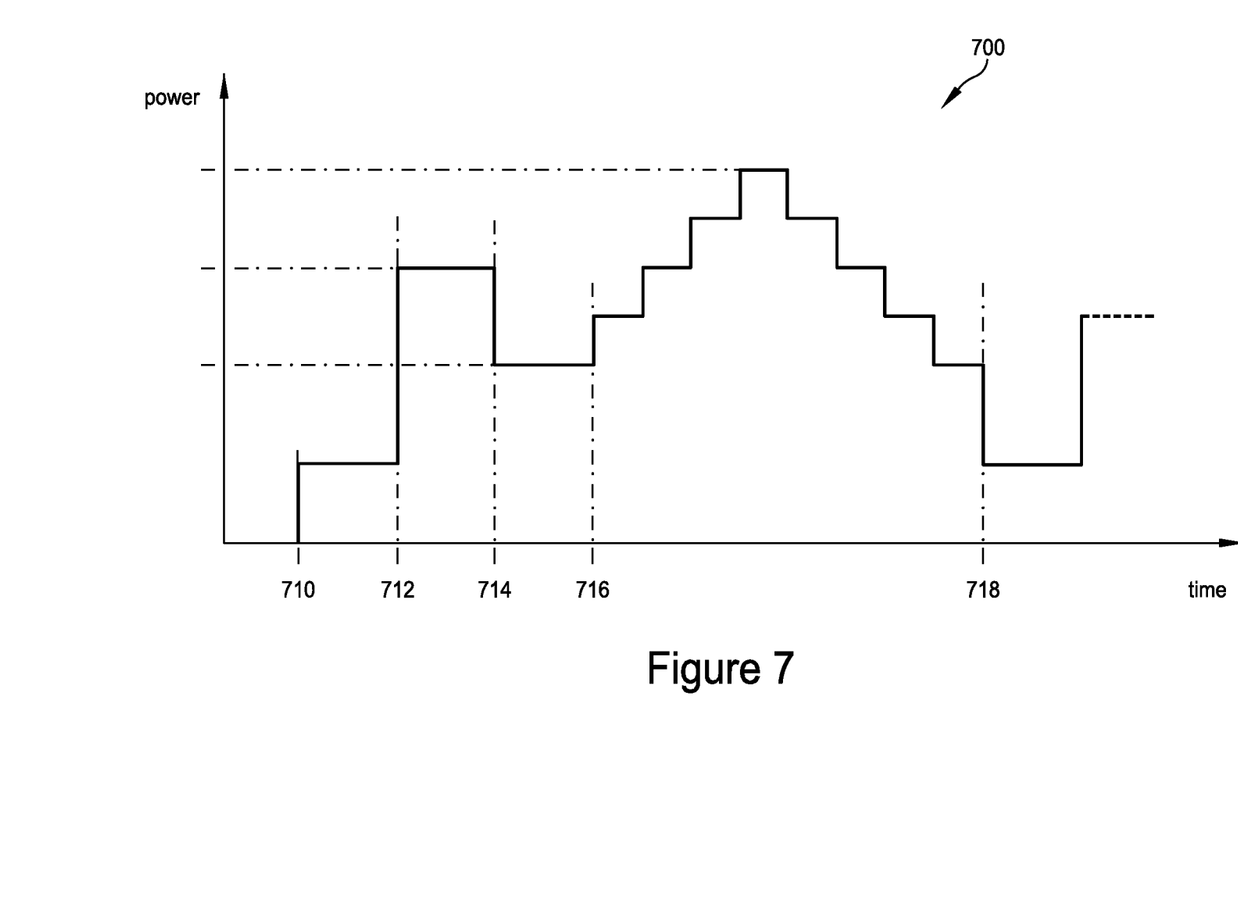
FIG. 7 illustrates an example load profile according to aspects of some embodiments.

FIG. 7 shows an example load profile 700 of a facility. The load profile 700 can be a load profile measured by monitoring the power drawn by the facility. The load profile 700 can also represent a predicted load profile of the facility. For example, the power monitoring system 100 can aggregate predicted load profiles of each of the critical and non-critical loads tracked by the monitoring devices 152, 162, 172, 182. The power monitoring system 100 can take into account operation parameters and environmental parameters in predicting load profiles. For example, at time 710, the power monitoring system 100 can predict that a set of internal lights will turn on, based on either a predetermined schedule or past measurements of the lighting circuit. At time 712, the power monitoring system 100 can predict that ventilation fans will also be turned on, raising the facility load to level 724. The power monitoring system 100 can predict that the lighting loads switch off at time 714, dropping the facility load level to 722. At time 716, one or more HVAC units can be predicted to start ramping up in operation, increasing the load over the course of the day.

Figure 8:
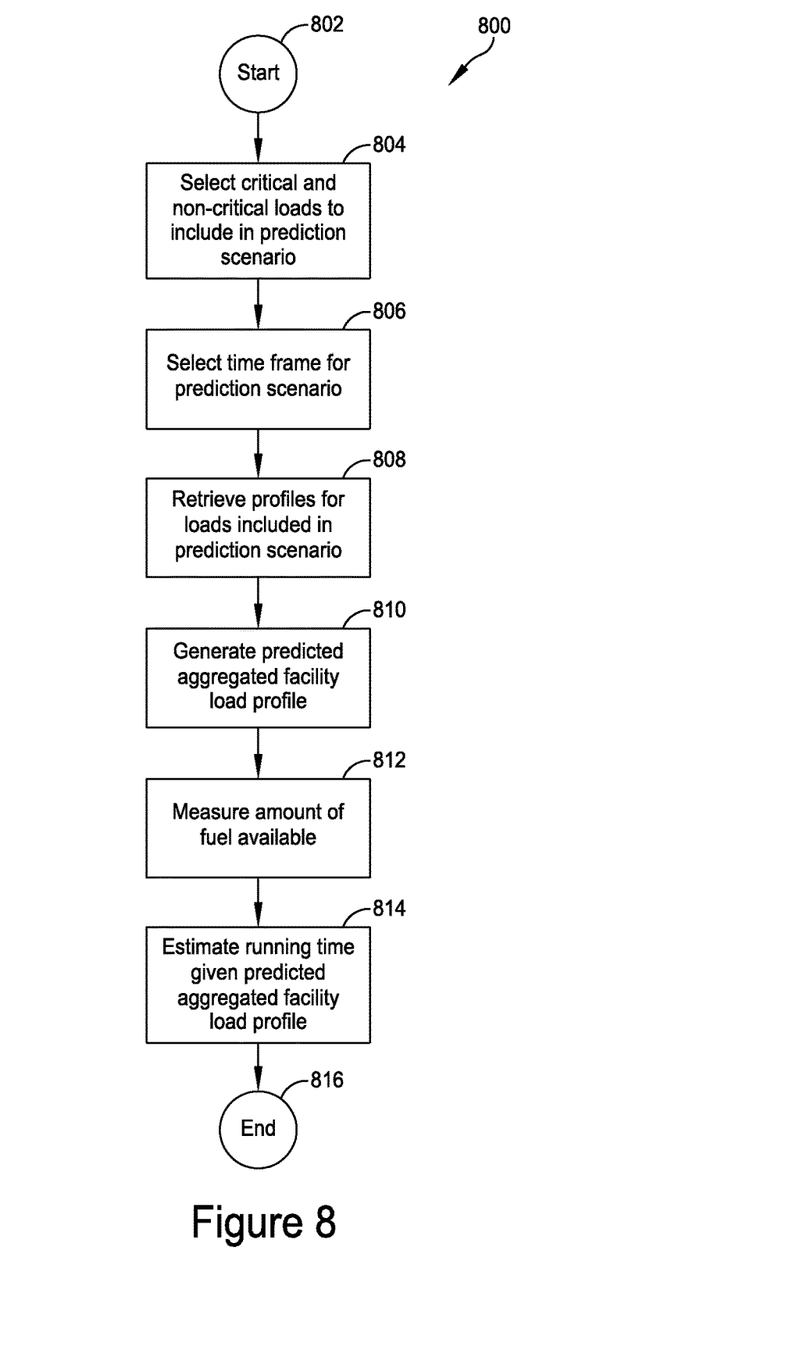
FIG. 8 illustrates a process flowchart of a power monitor system according to aspects of some embodiments.

Using a predicted aggregated facility load profile, the power monitoring system 100 can predict available remaining run time. For example, FIG. 8 shows an example process 800 for predicting available remaining generator time. The process starts at stage 802. At stage 804, critical and non-critical loads are selected to include in a prediction scenario. At stage 806, a time frame is selected for a prediction scenario. The time frame can correspond to an estimated time before the electric utility will be available to provide power to the facility. At stage 808, load profiles for the loads selected for the prediction scenario are retrieved. At stage 810, a predicted aggregated facility load profile is generated based on the retrieved load profiles and operational, environmental, and facility parameters. At stage 812, the amount of fuel available is measured. At stage 814, the available remaining running time is estimated based on the predicted aggregated facility load profile. The process can end at stage 816.

As described above, the load profiles used to predict the aggregated facility load profile can be load profiles determined by a schedule of operation (such as the schedule for a lighting system) or a programmed sequence of operation (such as cycles of a commercial washer/dryer). The load profiles can also be influenced by one or more environmental parameters resulting in multiple load profiles associated with the load. For example, the predicted amount of power drawn by the HVAC units can be determined based on the outdoor temperature or a predicted outdoor temperature, such as from a weather forecast. The power monitoring system can manage a plurality of profiles for a load, such as determining a maximum, minimum, and average power levels for each load. The power monitoring system can receive information to predict operational, environmental, and facility parameters to determine the load profiles used. For example, weather forecasts can be used to determine outdoor temperature. Sunrise and sunset times can be used to determine when lighting systems might be used. Load profiles can span varying amounts of time. For example, a load profile can show the power drawn for a day, a week, a month, a year, or longer. Some load profiles can be relatively similar every day, regardless of time of year or other environmental parameters. Some load profiles can have weekly, monthly, or yearly cycles that can provide more accurate information depending on the point in the time interval. Monitored load profiles and models can be updated and adjusted for a predetermined amount of time, at various intervals, or constantly.

Predicted available generator running time can be generated for various scenarios. For example, predicted available running time can be generated for powering critical loads only, both critical loads and non-critical loads, critical loads and non-delayable non-critical loads, or any other appropriate combination. Environmental, operational, and facility parameters can also be adjusted to predict different scenarios. The scenarios generated can be a preconfigured list of conditions, or entered by a user through a client interface to the power monitoring system. The predicted available running time can be updated periodically and/or based on a user input.

In some embodiments, the power monitoring system can generate scenarios based on the loads and parameters to provide operating conditions that would maximize the remaining time available. For example, the power monitoring system can generate and compare a set of scenarios for powering the critical loads and provide the scenario and changeable electrical, environmental, operational, and facility parameters that would allow the facility to run the longest on the remaining fuel. For example, the power monitoring system can provide various scenarios depending on the power usage. For example, if a facility has multiple generators, the power monitoring system can provide predicted available running time for one or a plurality of the generators. The power monitoring system can also generate scenarios such as powering the facility using multiple generators at the same time, or one generator after another. For example, one generator running near full capacity may be more fuel efficient in generating a similar level of power than two generators running near half capacity. The power monitoring system can take electrical parameters into consideration to optimize the efficiency of the power usage.

In some embodiments, the power monitoring system can generate scenarios to maximize the loads powered given a remaining amount of time. For example, if the generators will be powering the facility for two hours, after which the electric utility will be online, the power monitoring system can generate and compare scenarios to provide various non-critical loads that can remain operational with less risk of running out of fuel. In some embodiments, the loads can be prioritized or grouped with priorities so that scenarios can be generated to maximize powering of higher prioritized loads. Additionally or alternatively, operational schedules may be adjusted based on a known fuel replenishment schedule.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 9:
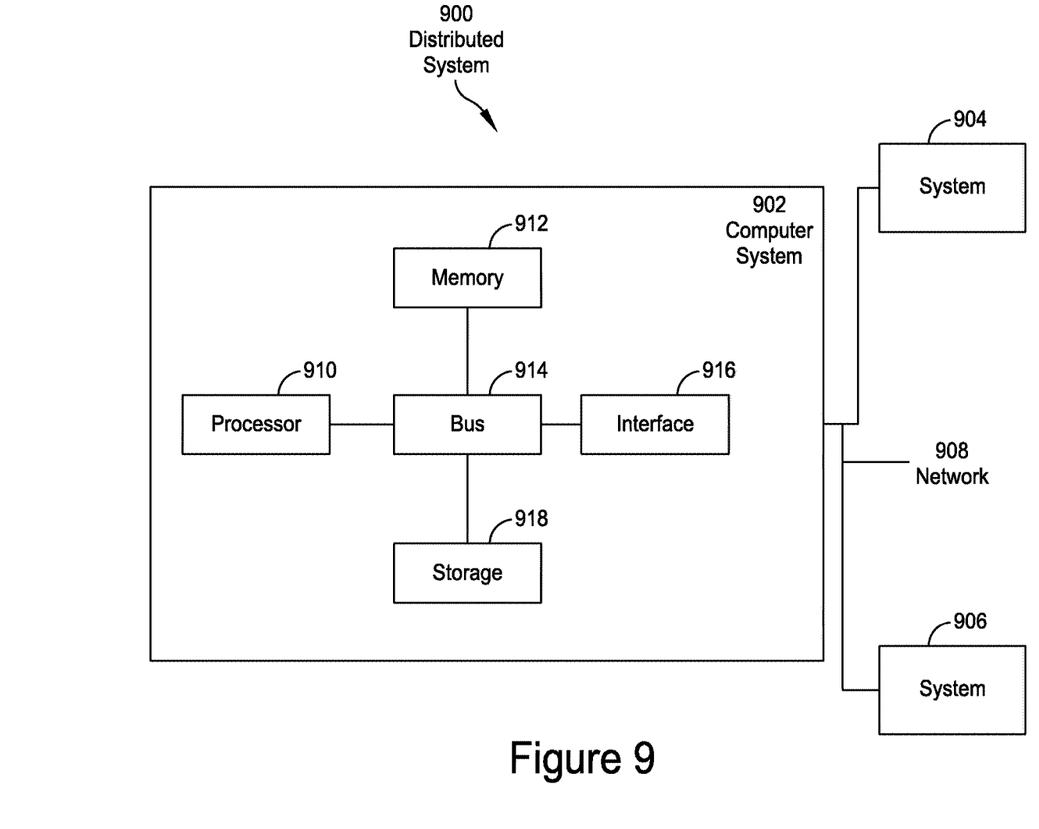
FIG. 9 is a schematic diagram of one example of a computer system that may perform processes and functions disclosed herein.

Referring to FIG. 9, there is illustrated a block diagram of a distributed computer system 900, in which various aspects and functions are practiced. As shown, the distributed computer system 900 includes one more computer systems that exchange information. More specifically, the distributed computer system 900 includes computer systems 902, 904 and 906. As shown, the computer systems 902, 904 and 906 are interconnected by, and may exchange data through, a communication network 908. The network 908 may include any communication network through which computer systems may exchange data. To exchange data using the network 908, the computer systems 902, 904 and 906 and the network 908 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 902, 904 and 906 may transmit data via the network 908 using a variety of security measures including, for example, TLS, SSL or VPN. While the distributed computer system 900 illustrates three networked computer systems, the distributed computer system 900 is not so limited and may include any number of computer systems and computing devices, networked using any medium and communication protocol.

As illustrated in FIG. 9, the computer system 902 includes a processor 910, a memory 912, a bus 914, an interface 916 and data storage 918. To implement at least some of the aspects, functions and processes disclosed herein, the processor 910 performs a series of instructions that result in manipulated data. The processor 910 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 910 is connected to other system components, including one or more memory devices 912, by the bus 914.

The memory 912 stores programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device. Various examples may organize the memory 912 into particularized and, in some cases, unique structures to perform the functions disclosed herein. These data structures may be sized and organized to store values for particular data and types of data.

Components of the computer system 902 are coupled by an interconnection element such as the bus 914. The bus 914 may include one or more physical busses, for example, busses between components that are integrated within a same machine, but may include any communication coupling between system elements including specialized or standard computing bus technologies such as IDE, SCSI, PCI and InfiniBand. The bus 914 enables communications, such as data and instructions, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and to communicate with external entities, such as users and other systems.

The data storage 918 includes a computer readable and writeable nonvolatile, or non-transitory, data storage medium in which instructions are stored that define a program or other object that is executed by the processor 910. The data storage 918 also may include information that is recorded, on or in, the medium, and that is processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller causes data to be read from the nonvolatile recording medium into another memory, such as the memory 912, that allows for faster access to the information by the processor 910 than does the storage medium included in the data storage 918. The memory may be located in the data storage 918 or in the memory 912, however, the processor 910 manipulates the data within the memory, and then copies the data to the storage medium associated with the data storage 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of predicting available run time of a generator to power a facility, the method comprising:
    monitoring a plurality of loads drawing power from the generator;
    monitoring a plurality of parameters that affect the amount of power drawn by the plurality of loads;
    monitoring a fuel consumption rate of the generator;
    generating a plurality of load profiles for each load of the plurality of loads, each load profile indicating power drawn by a corresponding load over a period of time for a set of values for of each parameter of the plurality of parameters;
    determining a set of loads from the plurality of loads for which a predicted time is to be generated;
    receiving values for each parameter of the plurality of parameters;
    generating a predicted load profile for the set of loads and the values of each parameter of the plurality of parameters;
    receiving information indicating an amount of remaining fuel; and
    calculating, on a computer system, a predicted available run time based on the power draw indicated by the predicted load profile, the fuel consumption rate of the generator, and the amount of remaining fuel,
    wherein generating the predicated load profile includes aggregating two or more load profiles of the plurality of load profiles to predict future power usage of the set of loads, and
    wherein the two or more load profiles correspond to two or more loads.

2. The method of claim 1, further comprising identifying a first group of the plurality of loads as critical loads and identifying a second group of the plurality of loads as non-critical, and wherein the set of loads includes at least the first group of the plurality of loads.

3. The method of claim 1, further comprising identifying a first group of the plurality of loads as delayable loads and identifying a second group of the plurality of loads as non-delayable loads, and wherein the set of loads includes at least the second group of the plurality of loads.

4. The method of claim 1, wherein the received values for the plurality of parameters include predicted values for the plurality of parameters.

5. The method of claim 1, further comprising determining a plurality of sets of the plurality of loads for which a predicted time is to be generated.

6. The method of claim 5, further comprising:
    receiving a length of time; and
    providing one or more of the plurality of sets of the plurality of loads for which the predicted time is longer than the length of time.

7. The method of claim 6, wherein the loads comprise a priority ranking, and the one or more provided sets comprises an optimized number of powered loads based on the priority ranking.

8. The method of claim 1, wherein the generator is a generator system comprising a plurality of generators coupled to a plurality of fuel tanks, the method further comprising:
    determining one or more sets of the plurality of generators to power the loads; and
    calculating a predicted available run time for each of the one or more sets of the plurality of generators.

9. A power monitoring system for a facility, comprising:
    a generator coupled to a fuel tank;
    a plurality of monitors configured to monitor power drawn by loads in the facility from the generator;
    a processor configured to be coupled to the plurality of monitors and configured to:
        monitor a plurality of loads drawing power from the generator using the plurality of monitors;
        monitor a plurality of parameters that affect the amount of power drawn by the plurality of loads;
        monitor a fuel consumption rate of the generator;
        generate a plurality of load profiles for each load of the plurality of loads, each load profile indicating power drawn by a corresponding load over a period of time for a set of values for each parameter of the plurality of parameters;
        receive a set of loads of the plurality of loads for which a predicted time is to be generated;
        receive values for each parameter of the plurality of parameters;
        generate a predicted load profile for the set of loads and the values for each parameter of the plurality of parameters;
        receive information indicating an amount of remaining fuel; and
        calculate a predicted available run time based on the power drawn indicated by the predicted load profile, the fuel consumption rate of the generator, and the amount of remaining fuel,
        wherein generating the predicted load profile includes aggregating two or more load profiles of the plurality of load profiles to predict future power usage of the set of loads, and
        wherein the two or more load profiles corresponds to two or more loads.

10. The system of claim 9, wherein the processor is further configured to identify a first group of the plurality of loads as critical loads and identify a second group of the plurality of loads as non-critical, and wherein the set of loads includes at least the first group of the plurality of loads.

11. The system of claim 9, wherein the processor is further configured to identify a first group of the plurality of loads as delayable loads and identify a second group of the plurality of loads as non-delayable loads, and wherein the set of loads includes at least the second group of the plurality of loads.

12. The system of claim 9, wherein the received values for the plurality of parameters include predicted values for the plurality of parameters.

13. The system of claim 9, wherein the processor is further configured to determine a plurality of sets of the plurality of loads for which a predicted time is to be generated.

14. The system of claim 13, wherein the processor is further configured to:
receive a length of time; and
provide one or more of the plurality of sets of the plurality of loads for which the predicted time is longer than the length of time.

15. The system of claim 14, wherein the loads comprise a priority ranking, and the one or more provided sets comprises an optimized number of powered loads based on the priority ranking.

16. The system of claim 9, wherein the generator is a generator system comprising a plurality of generators coupled to a plurality of fuel tanks, and wherein the processor is further configured to:
determine one or more sets of the plurality of generators to power the loads; and
calculate the predicted available run time for each of the one or more sets of the plurality of generators.

17. A non-transitory computer readable medium having stored thereon sequences of instruction for predicting available run time for a generator including instructions that will cause at least one processor to:
monitor plurality of loads drawing power from the generator;
monitor a plurality of parameters that affect the amount of power drawn by the plurality of loads;
monitor a fuel consumption rate of the generator;
generate a plurality of load profiles for each load of the plurality of loads, each load profile determining power drawn by a corresponding load over a period of time for a set of values for each parameter of the plurality of parameters;
determine a set of loads from the plurality of loads for which a predicted time is to be generated;
receive values for each parameter of the plurality of parameters;
generate a predicted load profile for the set of loads and the values of each parameter of the plurality of parameters;
receive information indicating an amount of remaining fuel; and
calculate, on a computer system, a predicted available run time based on the power draw indicated by the predicted load profile, the fuel consumption rate of the generator, and the amount of remaining fuel,
wherein generating the predicated load profile includes aggregating two or more load profiles of the plurality of load profiles to predict future power usage of the set of loads, and
wherein the two or more load profiles correspond to two or more loads.

18. The medium of claim 17, wherein the processor is further instructed to:
receive a length of time;
determine a plurality of sets of the plurality of loads for which a predicted time is to be generated; and
provide one or more of the plurality of sets of the plurality of loads for which the predicted time is longer than the length of time.

19. The medium of claim 17, wherein the loads comprise a priority ranking, and the one or more provided sets comprises an optimized number of powered loads based on the priority ranking.

20. The medium of claim 17, wherein the generator is a generator system comprising a plurality of generators coupled to a plurality of fuel tanks, and wherein the processor is further instructed to:
determine one or more sets of the plurality of generators to power the loads; and
calculate the predicted available run time for each of the one or more sets of the plurality of generators.

* * * * *